Patented Sept. 2, 1941

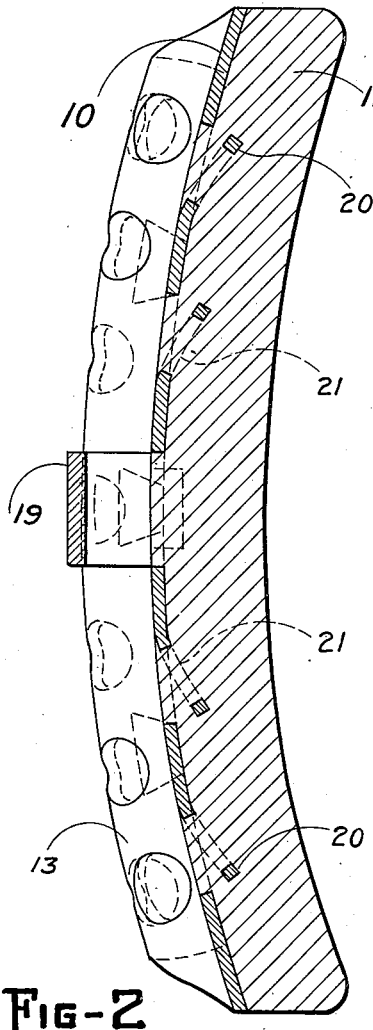
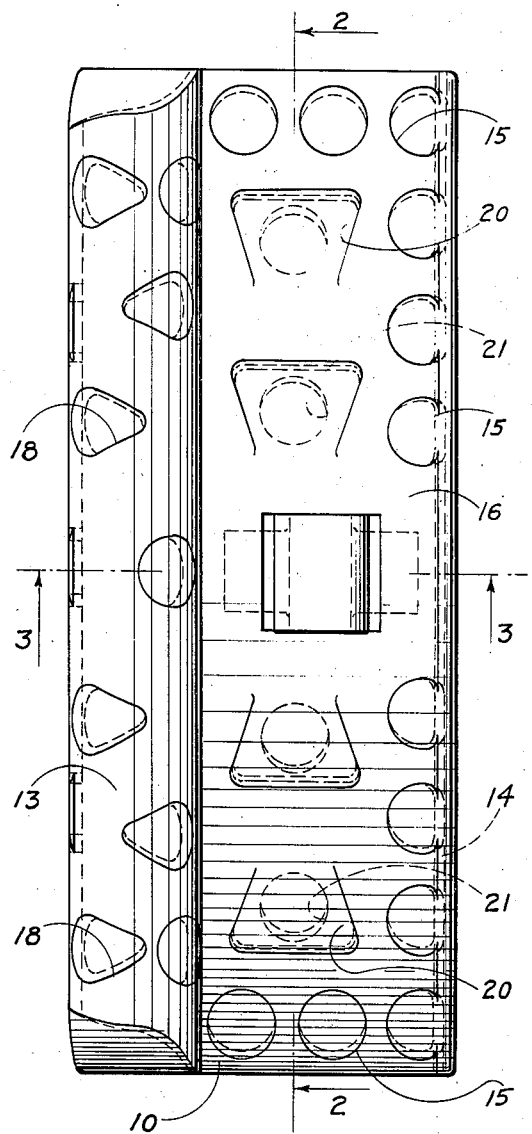
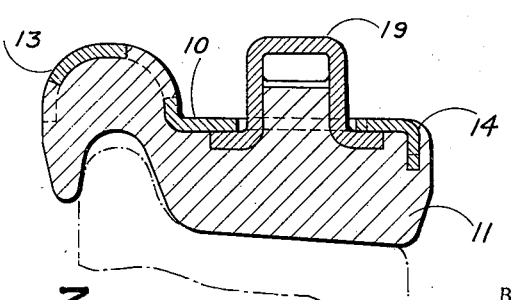

2,254,950

UNITED STATES PATENT OFFICE 2,254,950

BRAKE SHOE

Lewis Franklin Moore, Roanoke, Va., assignor to Walker Machine & Foundry Corporation, Roanoke, Va., a corporation of Virginia Application December 27, 1940, Serial No. 371,913

3 Claims. (Cl. 188—258)

This invention relates to improvements in brake shoes of the type employed on railway cars and the like embodying a cast metal brake shoe body provided with a reinforcing backing plate.

Brake shoes of this type are widely used on railway rolling stock. In service, the brake shoes are subject to severe shock and wear with the result that the cast body portions are liable to fracture. One of the intended functions of the backing plates in shoes of this type is to hold the pieces of the cast body in position in the event that the shoe is broken and various means and formations have been employed to secure the backing plate and body together. These have not been entirely satisfactory, however, and it is accordingly an object of the present invention to provide an improved brake shoe designed so that the body portion of the shoe is securely anchored to the reinforcing backing plate and is prevented from becoming separated therefrom upon the fracturing of the body portion. Further objects are to provide such a brake shoe which is reliable and efficient in service and economical of manufacture.

Other objects and advantages more or less ancillary to the foregoing and the manner in which all the various objects are realized will appear in the following description, which considered in connection with the accompanying drawing, sets forth the preferred embodiment of the invention.

I preferably accomplish the above and other objects of the present invention by providing a brake shoe with a reinforcing backing plate having tongues stamped from the central portion thereof and projecting into the body of the shoe, the tongues having openings therethrough. The backing plate may also have a plurality of openings adjacent the sides and ends thereof, with the result that during the casting operation the body metal may flow into all of said openings and around said tongues for anchoring the body to the plate.

Referring to the drawing:

Fig. 1 is a plan view of the back of a brake shoe embodying the present invention; Fig. 2 is a longitudinal sectional view of the brake shoe showing the downwardly projecting tongues formed on the backing plate and having openings therethrough with the body metal of the shoe anchored thereto, the section being taken on a plane indicated by line 2—2 of Fig. 1; and Fig. 3 is a transverse sectional view of the brake shoe taken on the plane indicated by line 3—3 of Fig. 1.

The invention is illustrated in the drawing as it may be applied to a brake shoe of the flanged type comprising a reinforcing backing plate 10 with a metallic shoe body 11 cast thereon. The plate 10 is preferably a steel stamping while the body 11 is preferably cast iron.

The plate 10 has a curved flange 13 formed on one side thereof while the opposite side has a downturned flange 14 which is embedded in the metallic body 11. A plurality of openings 15 are formed in the plate 10 adjacent the sides and ends thereof, with the openings adjacent the flange 14 disposed partly in the arcuate portion or body 16 of the plate 10 and partly in the downturned flange 14. The curved flange 13 is provided with a number of elongated openings 18 formed therein and spaced from one end to the other thereof with a segment of the openings extending over the longitudinal center line of the flange portion. By providing elongated openings as shown, a strong interlock can be formed between the cast body and the flange portion of the plate without unduly weakening the plate. During the casting operation, the metal of the body 11 flows into the openings 15 and 18 formed in the plate 10 to anchor the plate to the body and thus form a reinforcing backing member for the body of the brake shoe.

The metallic body 11 is preferably formed with chilled portions or inserts, not shown, which are adapted to engage the tread and flange portion of a locomotive or car wheel. The shoe is also provided with a channel shaped attaching lug 19 which has its sides embedded within the metallic body 11 and its base portion projecting through an opening formed in the body 16 of the backing plate 10.

In order to more securely hold the body of the shoe to the reinforcing back, a plurality of tongues or projections 20, having openings 21 formed therein, are stamped or cut from the body portion 16 of the plate 10. The tongues are preferably disposed in a line extending longitudinally of the shoe, with equal numbers of the tongues positioned on opposite sides of the attaching lug 19, and are bent downwardly with their free ends projecting towards their respective ends of the plate 10. In manufacturing brake shoes according to my invention the backing plates are preferably formed from steel stock by punch-press or similar operations into the desired shape and with the various openings and tongues described above. The metallic body 11 is then cast on the plate 10 with the metal thereof flowing into the openings 15 and 18 and around and through the tongues 20.

As shown in Fig. 2, the openings 21 formed in the inwardly extending tongues 20 permit the metal of the body 11 to flow therethrough during the casting operation and thus completely surround the tongues with metal to provide a positive attachment of the body to the plate. The metal of the body 11 flows around and through the tongues 20 and up into the openings formed in the plate 10 by the stamping and downwardly bending of the tongues 20. The tongues, with their openings 21, thus cooperate with the openings 15 and 18 to hold the parts of the brake shoe together and securely interlock the backing plate and body, so that if the cast body should fracture, the parts thereof would still be held together, thus extending the useful life of the shoe.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake shoe including a reinforcing plate having perforated tongues bent out of the plane thereof and projecting beyond the inner surface thereof, and a cast metal body surrounding said tongues on all their free sides and filling said perforations and the openings provided in the plate by the deformation of the tongues.

2. A brake shoe including a reinforcing plate, a plurality of perforated tongues formed therein on opposite sides of the transverse center of the plate, said tongues being bent out of the plane of the plate and projecting beyond the inner surface thereof and extending towards the adjacent ends of the plate and a cast metal body surrounding said tongues on all their free sides and filling said perforations and the openings provided in the plate by the deformation of said tongues.

3. A brake shoe including a reinforcing plate, a plurality of apertured tongues each attached at one end to said plate and extending beyond the inner surface thereof, said tongues being wider at their free ends than at their attached ends, and a cast body metal surrounding said tongues on all free sides and filling the apertures and the openings left in the plate when the tongues were formed.

LEWIS FRANKLIN MOORE.